Patented May 5, 1942

2,281,613

UNITED STATES PATENT OFFICE 2,281,613

POLYMERIZING BUTADIENE HYDROCARBONS

Heinz Wollthan, Marl-Drewer, and Wilhelm Becker, Cologne-Mulheim, Germany, assignors to Jasco Incorporated, a corporation of Louisiana No Drawing. Application March 13, 1941, Serial No. 383,158. In Germany September 29, 1937

9 Claims. (Cl. 260—32)

The present invention relates to a new process of polymerizing butadiene hydrocarbons in aqueous emulsions and is a continuation in part of our application Ser. No. 231,914.

Butadiens-1.3 can be polymerized, for instance, by simple heating or in aqueous emulsion. In case of butadiene hydrocarbons the latter method is preferred as it yields products which more closely resemble natural rubber than the heat polymerizates. Contrary thereto, 2-chlorobutadiene yields rubber-like products in both cases though nowadays the working in aqueous emulsion is also preferred. On the other hand, the emulsion polymerization easily results in the formation of products which are insoluble in benzene and resemble vulcanized rubber rather than the unvulcanized product. In consequence thereof, the working of these products on the roller and the incorporation therewith of filling materials and the ingredients which are necessary for effecting vulcanization is connected with considerable difficulties. In the case of the heat polymerization of 2-chlorobutadiene it has been proposed to avoid these disadvantages by working in the presence of certain regulating agents among which there are mentioned inter alia butyl mercaptan and thiocresol. All these auxiliary agents suffer from the disadvantage that they exert besides the regulating effect also a distinct retarding effect upon the course of the polymerization; moreover, the formation of the undesired dimeric by-products may be favored thereby. In the case of 2-chlorobutadiene-1.3 which has a very high tendency to polymerize the regulating effect considerably exceeds the retarding effect, whereas in the case of butadiene hydrocarbons the retarding effect of these auxiliary agents can be such as to entirely stop the reaction. This is true in the first line in the case of the emulsion polymerization.

It is the object of the present invention to do away with these disadvantages and to develop a new process which allows one to polymerize butadiene hydrocarbons in aqueous emulsion without retarding the course of the reaction and without involving the formation of products which are insoluble in benzene. Other objects of our invention will be apparent from the following description and claims.

In accordance with the present invention there are employed as auxiliary agents for the polymerization of butadien hydrocarbons or of mixtures of butadiene hydrocarbons with copolymerizable vinyl compounds in aqueous emulsion such mercaptanes as contain at least six carbon atoms. Our invention is based on the discovery that in the process defined the retarding effect is decreased and the regulating effect is raised with an increase of the number of carbon atoms of the mercaptanes, i. e. with an increase of the lyophilic character thereof. This is illustrated by the fact that butyl mercaptane entirely stops the polymerization if added to an aqueous emulsion of butadiene hydrocarbons, whereas there is no retarding effect at all observed in the case of octadecyl mercaptane. Also lower mercaptanes may be employed, provided that the number of the aliphatic carbon atoms is at least 6. In most cases an amount of less than about 1% of these auxiliary agents (calculated on the amount of monomeric products) is sufficient to exert the desired effect; in other cases somewhat higher amounts are required. Depending on the amount of auxiliary agents the resulting polymerizates either resemble natural rubber or are of a more plastic nature. In accordance with a preferred method of working the mercaptanes of the character described are added gradually to the emulsion during polymerization. Thus, part of the mercaptanes can be incorporated within the reaction mixture prior to polymerization, the remaining part being added thereto in portions in the course of the reaction.

The new process can be applied to every possible butadiene-1.3 hydrocarbon, and also to mixtures thereof or to mixtures of butadiene-1.3 hydrocarbons with copolymerizable vinyl compounds. The term "butadiene-1.3 hydrocarbon" is intended to embrace the unsubstituted butadiene as well as the homologues thereof such as isoprene or 2.3-dimethylbutadiene. Examples for suitable copolymerizable vinyl compounds are styrene, acrylic acid nitrile, acrylic acid esters, vinylmethylketone, fumeric acid esters and the like, it being understood that these compounds contain a single C=C double linkage in contradistinction to the butadienes. The mercaptanes are preferably of the aliphatic series though alkylated aromatic mercaptanes are not excluded. The effect described above is obtained regardless as to whether the polymerization is effected in an alkaline, neutral or acid medium.

The following examples illustrate the present invention without, however, restricting it thereto, the parts being by weight:

Example 1

75 parts of butadiene, 25 parts of styrene and 0.5 part of isohexyl mercaptane are emulsified in 200 parts of a 10% sodium oleate solution having dissolved therein 0.3 part of ammonium persulfate. The emulsion is stirred for several days at about 30° C. After coagulation a very plastic and easily soluble polymerizate is obtained in an excellent yield.

*Example 2*

75 parts of butadiene, 25 parts of styrene and 1 part of octadecylmercaptane are emulsified in 142 parts of an aqueous solution containing 3.6 parts of the sodium salt of isobutyl naphthalene sulfonic acid and 0.37 part of potassium persulfate and some alkali metal hydroxide. The emulsion is shaken for several days at 30° C. After coagulation a very plastic polymerizate is obtained in an excellent yield.

*Example 3*

100 parts of butadiene and 3 parts of octadecylmercaptane are emusified in a solution of 3.6 parts of sodium isobutyl naphthalene sulfonate, 0.37 part of potassium persulfate and some alkali metal hydroxide in 142 parts of water. After a several days' shaking of the emulsion at 30° C. a very plastic and easily soluble polymerizate is obtained.

*Example 4*

3 parts of p-diethylamino ethoxy oleyl anilide are dissolved in 220 parts of water and then neutralized by means of hydrogen chloride. 74 parts of butadiene and 26 parts of acrylic acid nitrile are emulsified therein. Upon the addition of 0.15 part of ammonium persulfate and 2 parts of dodecyl mercaptan the acid reacting emulsion is stirred for about 48 hours at ordinary temperature. By salting out there are obtained 80 parts of a very plastic mixed polymerizate which can be easily worked on the roller.

*Example 5*

50 parts of butadiene and 50 parts of vinylmethylketone are emulsified within the reaction mixture described in Example 4. After a 48 hours' stirring of the emulsion at 30° C. there are obtained after the addition of sodium chloride and of acetic acid 80 parts of a very plastic mixed polymerizate which can be easily worked on the roller.

We claim:

1. The process which comprises polymerizing a material selected from the group consisting of butadiene-1.3 hydrocarbons and mixtures of butadiene-1.3 hydrocarbons with copolymerizable compounds having a single C=C double linkage in aqueous emulsion in the presence of mercaptanes having at least 6 carbon atoms in aliphatic linkage.

2. The process as claimed in claim 1 wherein the other polymerizable compound is styrene.

3. The process as claimed in claim 1 wherein the other polymerizable compound is acrylic acid nitrile.

4. In the process of polymerizing a butadiene-1,3 hydrocarbon in water emulsion in the presence of an emulisfying agent and a polymerization catalyst, the step of conducting the polymerization in the presence of a mercaptan having from 6 to 12 carbon atoms per molecule.

5. In the process of polymerizing a butadiene-1,3 hydrocarbon in emulsion in water with an emulsifying agent and a polymerization catalyst, the step of conducting the polymerization in the presence of isohexyl mercaptan.

6. In the process of polymerizing a butadiene-1,3 hydrocarbon in emulsion in water with an emulsifying agent and a polymerization catalyst, the step of conducting the polymerization in the presence of dodecyl mercaptan.

7. In the process of polymerizing a butadiene-1,3 hydrocarbon in emulsion in water with an emulsifying agent and a polymerization catalyst, the step of conducting the polymerization in the presence of octadecyl mercaptan.

8. In the process of preparing a plastic interpolymer of butadiene and acrylic acid nitrile in emulsion in water in the presence of an emulsifying agent and a polymerization catalyst, the step of conducting the polmerization in the presence of dodecyl mercaptan.

9. In the process of preparing a plastic interpolymer of butadiene and styrene in emulsion in water in the presence of an emulsifying agent and a polymerization catalyst, the step of conducting the polymerization in the presence of dodecyl mercaptan.

HEINZ WOLLTHAN.
WILHELM BECKER.